United States Patent [19]
Syiek

[11] Patent Number: 6,017,094
[45] Date of Patent: Jan. 25, 2000

[54] TRAVEL PILLOW

[75] Inventor: Joseph A. Syiek, Huntington Beach, Calif.

[73] Assignee: Index Intergroup, Inc., Huntingdon Beach, Calif.

[21] Appl. No.: 09/251,026

[22] Filed: Feb. 18, 1999

Related U.S. Application Data

[60] Provisional application No. 60/075,500, Feb. 23, 1998.

[51] Int. Cl.[7] .................................................. A47C 31/00
[52] U.S. Cl. ...................................... 297/482; 297/DIG. 6
[58] Field of Search ............................... 297/DIG. 6, 487, 297/488, 482, 397, 391, 483; 24/16 R, 442; 5/630, 636, 552; 280/727, 801.1, 808, 805

[56] References Cited

U.S. PATENT DOCUMENTS

| | | |
|---|---|---|
| 5,114,185 | 5/1992 | Reedom . |
| 5,322,349 | 6/1994 | Gianino . |
| 5,566,871 | 10/1996 | Weintraub . |
| 5,584,536 | 12/1996 | White . |
| 5,785,388 | 7/1998 | Curtis . |

FOREIGN PATENT DOCUMENTS 694407  10/1979  U.S.S.R. .

Primary Examiner—Milton Nelson, Jr.
Attorney, Agent, or Firm—Pandiscio & Pandiscio

[57] ABSTRACT

A travel pillow for attachment to a shoulder harness seat belt.

4 Claims, 5 Drawing Sheets

6,017,094

1

TRAVEL PILLOW

REFERENCE TO PRIOR PENDING PROVISIONAL PATENT APPLICATION

This patent application claims benefit of pending prior U.S. Provisional Patent Application Serial No. 60/075,500, filed Feb. 23, 1998 by Joseph A. Syiek for TRAVEL PILLOW.

FIELD OF THE INVENTION

The invention is a soft good designed to enhance personal comfort and convenience. The invention preferably incorporates a pillow, pillow covering, flexible strap and attachment mechanisms. The largest anticipated application will be in settings where shoulder harness seat belts are available, typically in an automobile. However, the invention may also be used under various other conditions and in a variety of other settings.

BACKGROUND OF THE INVENTION

The invention was designed in response to the need for an attractive, comfortable and appropriately-sized pillow to use during travel. The desire for a mechanism to secure the pillow in a convenient and functional position was a principal factor in the invention's design. Commonly available pillows are frequently too large for the intended purpose, tend to be designed predominantly for adult use, and/or are not finished with fabrics that are particularly appealing to children, who represent a major user segment. The failure of existing alternatives often leads travelers, both adults and children, to roll or crumble up jackets or towels in an effort to achieve a temporary, and less than satisfactory, solution.

SUMMARY OF THE INVENTION

The invention provides a pillow and associated connecting apparatus for easy use and non-obtrusive conveyance during travel. The travel pillow is sized to rest conveniently and securely between the user's shoulder and a shoulder harness seat belt, to which the travel pillow can be secured by means of its flexible strap and attachment mechanisms. The strap and attachment mechanisms permit the pillow to be fastened securely to, and removed easily from, the shoulder harness seat belt. The travel pillow may be used regardless of whether the shoulder harness is on the left or right side of the user. The travel pillow has been designed in such a manner as to ensure that it does not inhibit or interfere with the proper and safe operation of the seat belt itself. In its anticipated largest commercial application, the travel pillow will be finished with a sham or other covering, with the sham or other covering being made out of various fabrics selected for their bright colors and whimsical eye appeal. The use of a pillow sham and removable strap allow the necessary portions of the travel pillow to be easily laundered.

BRIEF DESCRIPTION OF DRAWINGS

These and other features of the present invention will be more fully disclosed or rendered obvious by the following detailed description of the preferred embodiment of the invention, which is to be considered together with the accompanying drawings wherein like figures refer to like parts, and further wherein.

2

Figure 1:
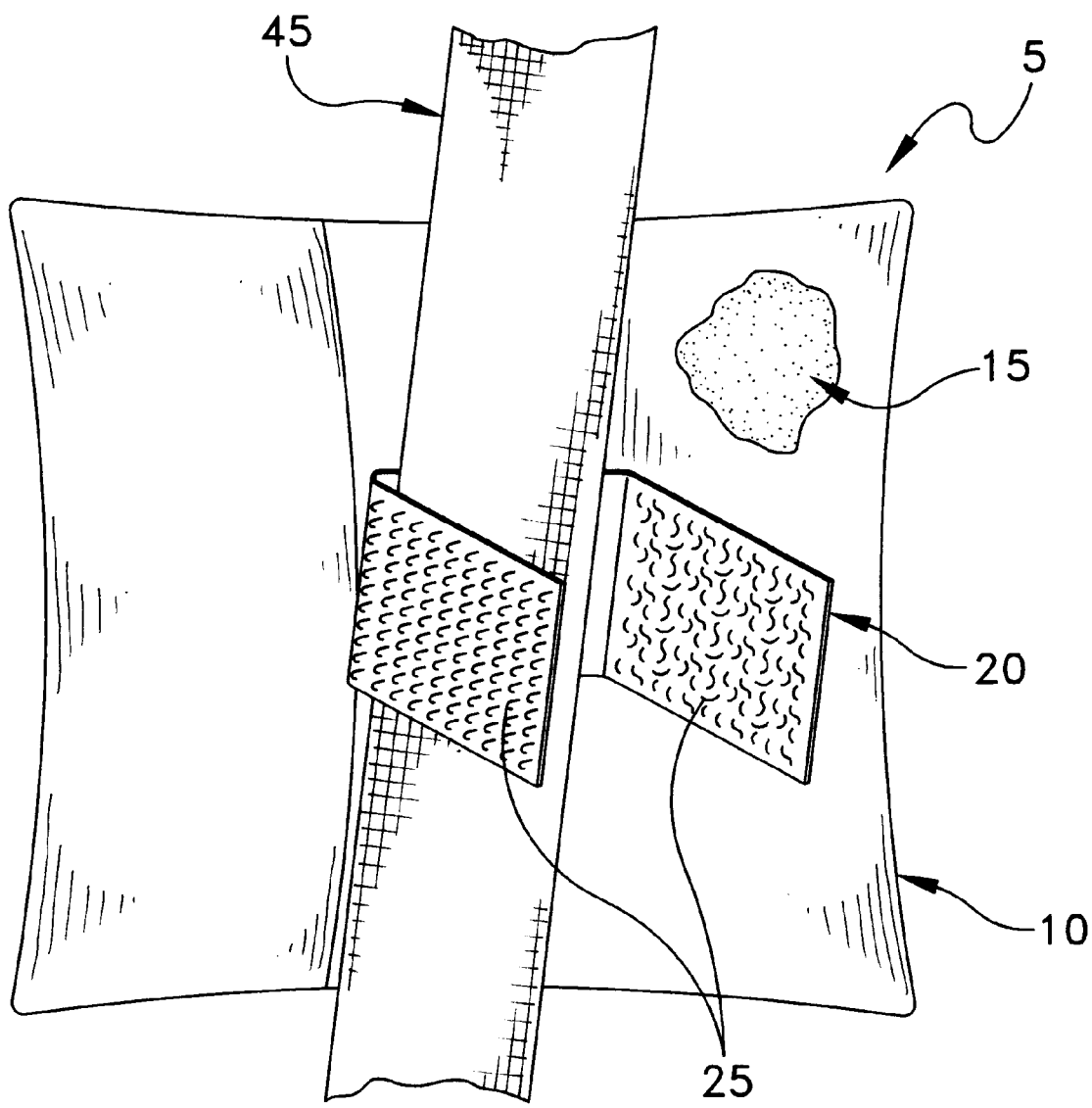
FIG. 1 shows a travel pillow formed in accordance with the present invention, with the travel pillow being secured to a seat belt.
Figure 2:
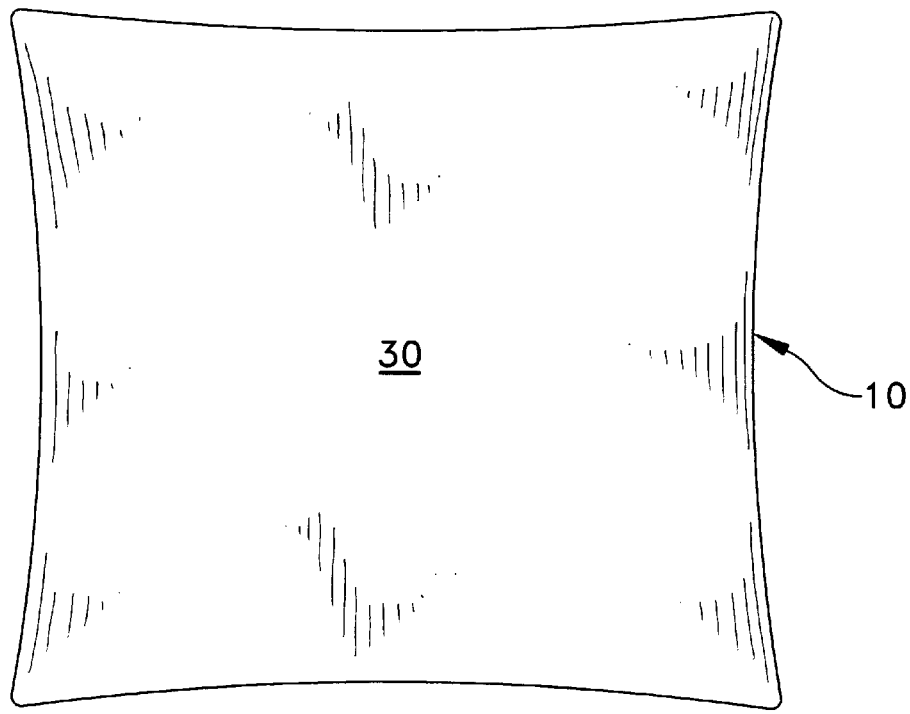
Figure 3:
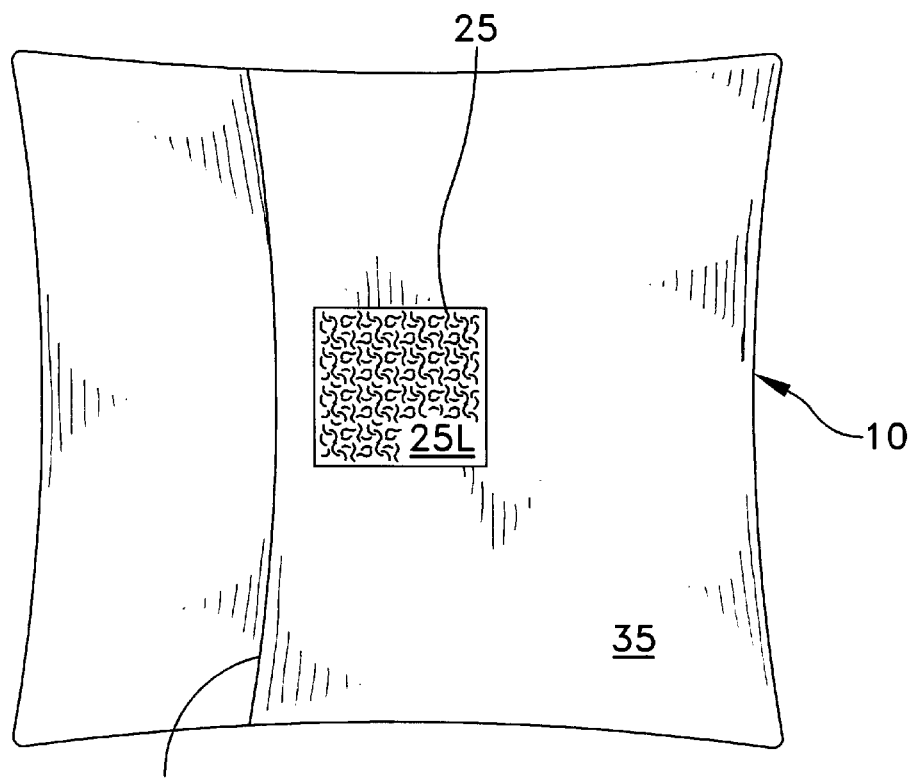
Figure 4:
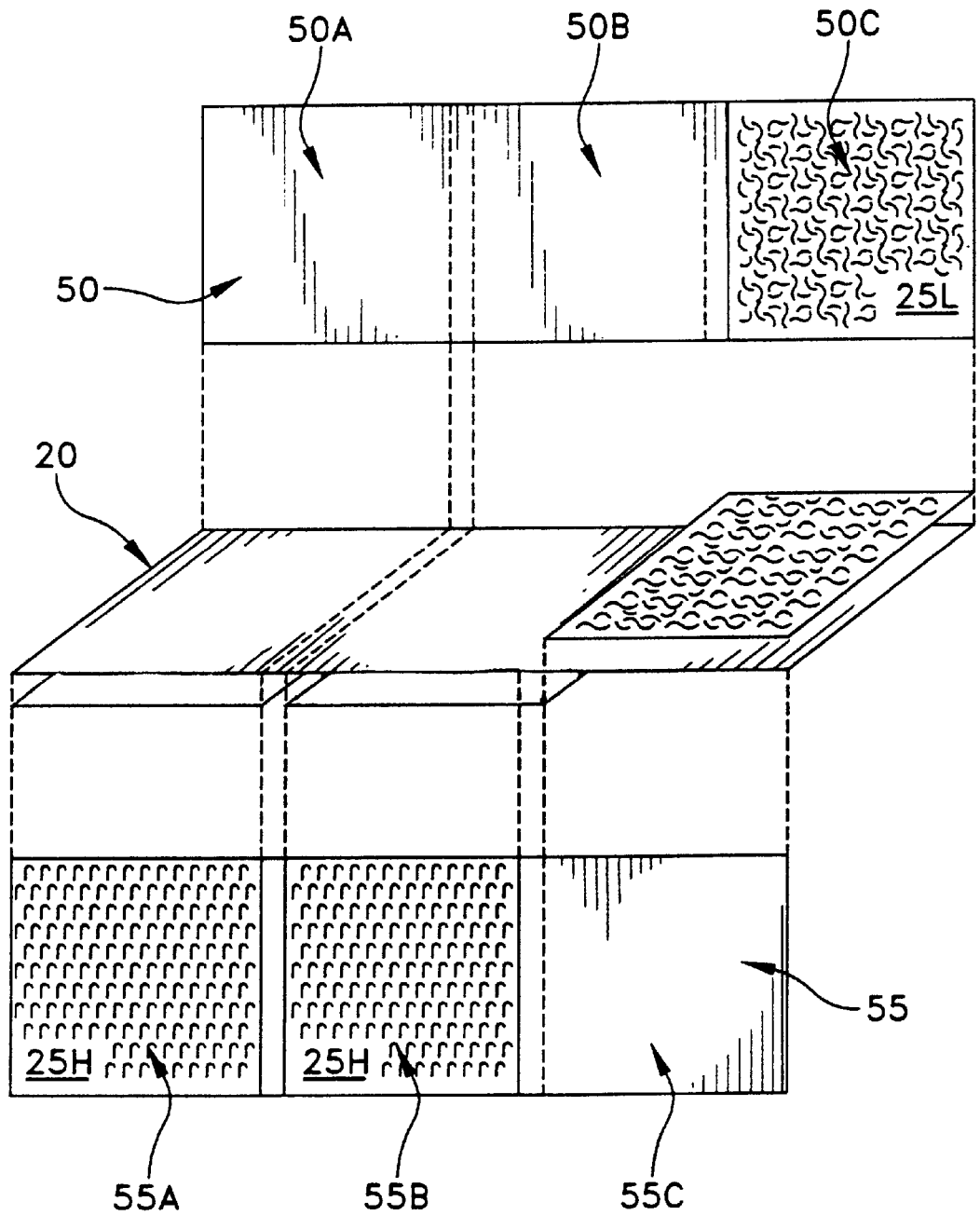
Figure 5:
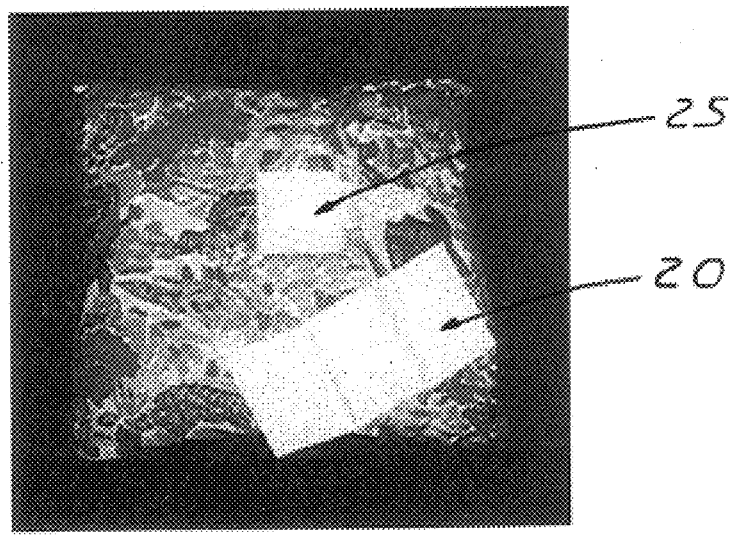
Figure 6:
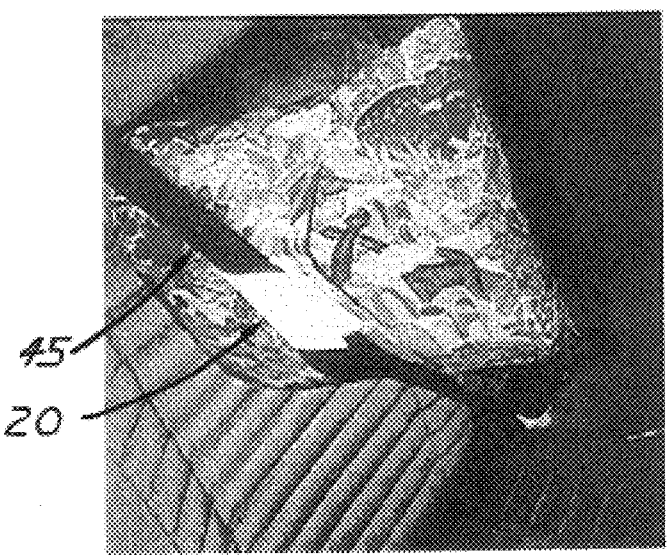
Figure 7:

FIG. 2 shows the front side of the pillow cover of the travel pillow shown in FIG. 1;

FIG. 3 shows the rear side of the pillow cover of the travel pillow shown in FIG. 1, with the pillow cover having one of the attachment mechanisms affixed to the center rear of the pillow covering;

FIG. 4 shows the flexible strap used to secure the covered pillow to the seat belt, with the flexible strap having various attachment mechanisms affixed to its front and rear sides;

FIG. 5 is photograph showing the flexible strap placed adjacent to the covered pillow;

FIG. 6 is a photograph showing the travel pillow attached to a seat belt;

FIG. 7 is a photograph showing the travel pillow in use; and

Figure 8:
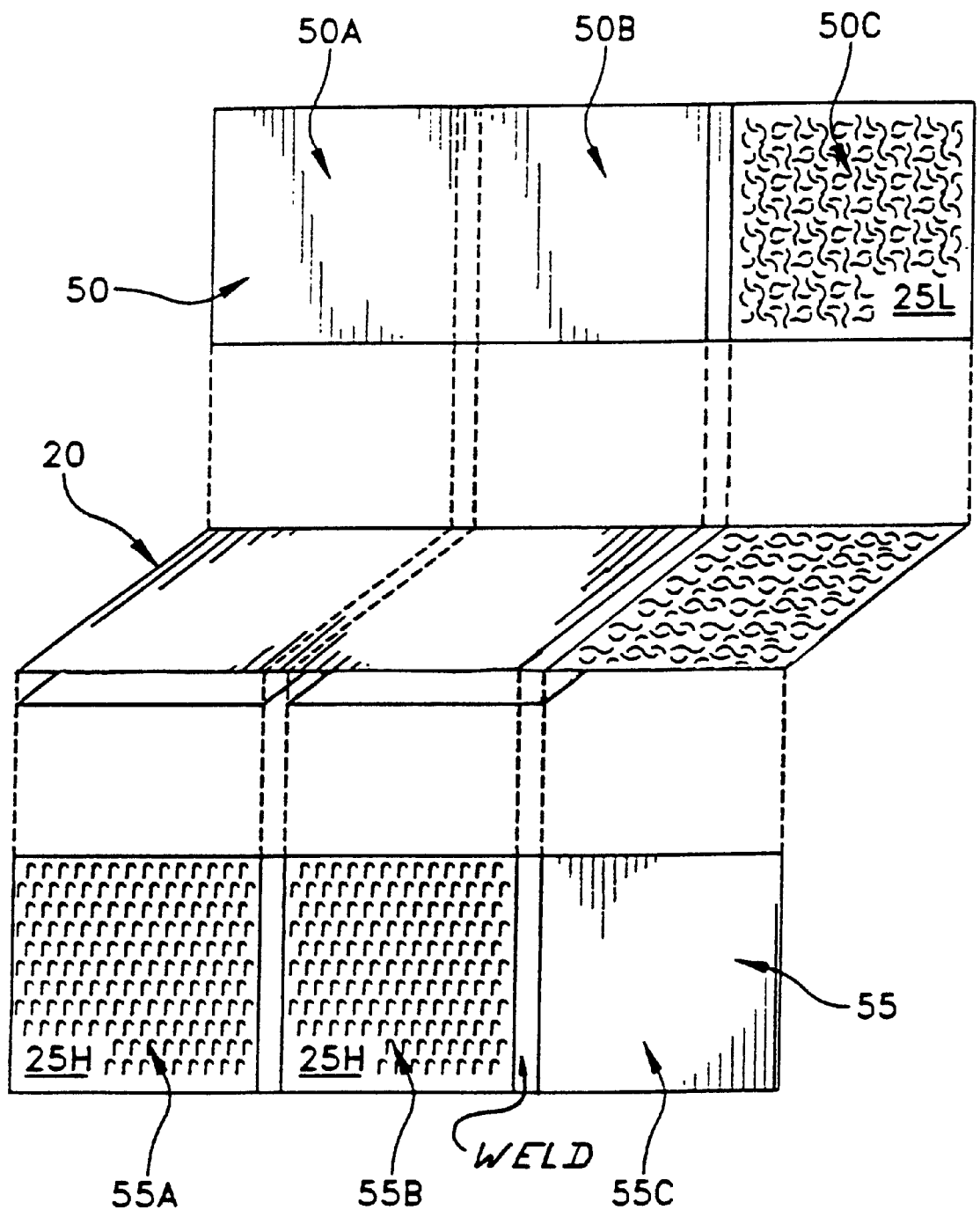

FIG. 8 is an alternative form of flexible strap.

DETAILED DESCRIPTION OF THE PREFERRED EMBODIMENT

This patent application claims benefit of pending prior U.S. Provisional Patent Application Serial No. 60/075,500, filed Feb. 23, 1998 by Joseph A. Syiek for TRAVEL PILLOW, which document is hereby incorporated herein by reference.

Looking first at FIG. 1, the preferred embodiment of the present invention comprises a travel pillow 5. Travel pillow 5 is comprised of several different components that, taken together, allow the invention to function and fulfill its intended purpose. These components are a pillow covering 10, a pillow 15, a flexible strap 20, and attachment mechanisms 25.

Flexible strap 20 and attachment mechanisms 25 essentially form connecting apparatus for connecting the covered pillow to the seat belt.

Looking next at FIGS. 1–3, pillow covering 10 is made of a soft fabric in a variety of colors, patterns and textures. Pillow covering 10 comprises a front surface 30 which is continuous and smooth so as to provide a comfortable surface for the user to lie against. The rear surface 35 of pillow covering 10 comprises an opening 40 to permit the insertion and removal of a pillow 15. Thus, in the preferred form of the invention, pillow covering 10 is essentially a pillow sham. The ability to remove the pillow 15 from pillow covering 10 makes it easy to launder the pillow covering 10 when necessary. However, this is a convenience, and not a requirement, of the present invention; if desired, the pillow covering 10 could be permanently sealed, with the pillow inside. An attachment mechanism 25 is secured to the central portion of the rear surface 35 of pillow covering 10, as will hereinafter be discussed below.

Looking again at FIG. 1, the pillow 15 used in travel pillow 5 is a small, soft pillow that conforms to the dimensions of pillow covering 10 when the pillow is inserted therein. The pillow itself could be any one of numerous commercially available products, or it could be constructed from raw goods specifically for use in the present invention.

Looking next at FIGS. 1 and 4, the flexible strap 20 is used to secure the covered pillow to a seat belt 45 by means of the attachment mechanisms 25 discussed below. The strap 20 may be composed of various strong and resilient fabrics (e.g., outdoor canvas, woven polyester or the equivalent) that easily hold the weight of the covered pillow and that will permit repeated folding and pulling without damage or deterioration.

Looking next at FIGS. 1, 3 and 4, attachment mechanisms 25 can be used to attach the covered pillow to the strap 20, and to secure the strap 20 to the seat belt 45. Attachment mechanisms 25 may comprise any of a variety of different attachment mechanisms known in the art for releasably attaching one object to another, e.g., mechanical snaps, hook-and-loop fasteners, etc. The preferred mechanisms are patches of hook-and-loop fabric that attach to the strap 20, and the covered pillow, as described below.

As shown in FIG. 3, a patch of loop fabric 25L is permanently attached to the center rear of the pillow cover 10.

As shown in FIG. 4, the flexible strap 20 has a first side 50 and a second side 55. Furthermore, each side of flexible strap 20 may be envisioned as having three panels A, B and C. Thus, the outer surface of flexible strap 20 can be considered to comprise six panels: three first side panels 50A, 50B and 50C; and three second side panels 55A, 55B and 55C. As will hereinafter be discussed in further detail, selected ones of these panels 50A, 50B, 50C, 55A, 55B and 55C have hook or loop fabric permanently attached thereto.

More particularly, panel 50C has loop fabric 25L extending outward therefrom; and panels 55A and 55B have hook fabric 25H extending outward therefrom. The hook or loop fabric may cover all of the panels 50C, 55A and 55B, or only selected portions of the panels.

Referring now to FIGS. 1, 3 and 4, the strap's second side center panel 55B is affixed to the rear of the covered pillow by mating the panel's hook fabric 25H with the pillow cover's loop fabric patch 25L. The strap 20 can then be secured around the seat belt 45 by first folding the strap's first side panel 50A over the seat belt, then folding the strap's first side panel 50C over the strap's second side panel 55A, and finally attaching those two panels to each other by mating the hook fabric 25H of second side panel 55A to the loop fabric 25L of first side panel 50C.

FIG. 5 is a photograph showing strap 20 placed adjacent to the rear side of the covered pillow.

FIG. 6 is a photograph showing the covered pillow and strap secured to a seat belt.

Taken together, the component parts enable the invention to fulfill its intended purpose, that is: to provide the user with a convenient, comfortable and attractive aid to sleep or rest in situations where a shoulder harness seat belt is available and normal repose is not typically sought.

FIG. 7 is a photograph showing the invention in use.

MODIFICATIONS OF THE PREFERRED EMBODIMENTS

Various modifications may, of course, be made to the preferred embodiment disclosed above without departing from the scope of the present invention.

Thus, for example, the pillow covering 10 could be modified in size or shape and still be usable with the strap 20 and attachment mechanisms 25. Various sizes, and a variety of fabric weight, texture, quality and design, could be used to provide alternatives to accommodate the personal preferences of users.

Alternatively, a finished pillow could be substituted for the combination of pillow covering 10 and pillow 15.

Also, the strap 20 could be constructed in various dimensions, and of various durable and flexible materials, that would preserve functionality.

Furthermore, the strap 20 could be permanently attached to the pillow covering 10 (or a finished pillow) if desired.

Also, portions of the strap 20 could be covered with fabric so as to match or blend with the pillow covering 10.

Additionally, the attachment mechanism 25 (for fastening the strap 20 to the covered pillow, and for fastening the strap 20 to the seat belt 45) could be modified so as to use snaps, other types of hooks and fasteners, or hook-and-loop fabric of different dimensions.

In lieu of hook-and-loop patches of determinate size, the entire strap 20 could be covered with hook-and-loop fabric on opposing sides or the strap 20 itself could be manufactured entirely of hook-and-loop fabric provided that the resulting position of the attachment mechanisms is as described herein. This latter configuration is the current preferred embodiment and FIG. 8 shows the specifications to which straps currently are being manufactured.

Further Aspects of the Invention

While it is anticipated that the present invention will have particular application to situations where it is desired to mount the travel pillow to a seat belt, it should also be appreciated that the travel pillow might also be mounted to elements other than seat belts. For example, the travel pillow might be mounted to a seat strap, the side or back of a chair, etc.

Advantages of the Invention

The invention is sized for easy use in the small space between the user's shoulder and a shoulder harness seat belt. It can be finished in various soft and brightly colored fabrics, with patterns selected for their whimsical eye appeal. The use of a pillow sham and removable strap allows the invention to be easily laundered. The strap is able to be conveniently and securely attached to the seat belt, and also may be removed easily when desired. The invention may be used equally well regardless of whether the shoulder harness is on the left or right side of the user. Also, the invention does not to inhibit or interfere with the proper and safe operation of the seat belt itself.

What is claimed is:

1. A travel pillow for attachment to a shoulder harness seat belt, said travel pillow comprising:

a pillow assembly;

a strap; and attachment mechanisms for attaching said pillow assembly to said strap and for attaching said strap to the seat belt;

wherein said strap comprises a first side and a second side, and a plurality of panels on said first side and said second side, and further wherein said attachment mechanisms attach a selected second side panel to said pillow assembly so as to attach said strap to said pillow assembly, and a selected first side panel to a selected second side panel so as to attach said strap to the seat belt.

2. A travel pillow according to claim 1 wherein said pillow assembly comprises a pillow and a pillow cover, wherein said pillow fits within said pillow cover, and further wherein said attachment mechanisms attach said pillow cover to said strap.

3. A travel pillow according to claim 1 wherein said strap comprises three first side panels and three second side panels, and further wherein said strap is attached to the seat belt by placing the seat belt against one first side panel, folding said strap so that another first side panel is placed against an opposite side of the seat belt, and folding said strap again so that the remaining first side panel is placed against a second side panel.

4. A travel pillow for attachment to a shoulder harness seat belt, said travel pillow comprising:

a pillow assembly;

a strap; and attachment mechanisms for attaching said pillow assembly to said strap and for attaching said strap to the seat belt;

wherein said attachment mechanisms comprise hook-and-loop fasteners; and wherein said strap comprises a first side and a second side, and a plurality of panels on said first side and said second side, and further wherein said attachment mechanisms attach a selected second side panel to said pillow assembly so as to attach said strap to said pillow assembly, and a selected first side panel to a selected second side panel so as to attach said strap to the seat belt, and further wherein a portion of loop material is attached to said pillow assembly, a portion of hook material is attached to the first-mentioned selected second side panel, a portion of hook material is attached to the second-mentioned selected second side panel, and a portion of loop material is attached to the selected first side panel.

* * * * *